US006216001B1

(12) United States Patent
Ghirnikar et al.

(10) Patent No.: US 6,216,001 B1
(45) Date of Patent: Apr. 10, 2001

(54) SERVICE LEVEL INDICATION AND REGISTRATION PROCESSING IN A WIRELESS COMMUNICATION DEVICE

(75) Inventors: Avinash L. Ghirnikar; Paul J. Lima, both of San Jose; Gregory J. Pinter, Danville, all of CA (US); Carl Edward Lippitt, Albuquerque, NM (US)

(73) Assignee: Wireless Access, Santa Clara, CA (US)

( * ) Notice: Subject to any disclaimer, the term of this patent is extended or adjusted under 35 U.S.C. 154(b) by 0 days.

(21) Appl. No.: 09/089,271

(22) Filed: Jun. 2, 1998

Related U.S. Application Data

(60) Provisional application No. 60/060,416, filed on Sep. 30, 1997.

(51) Int. Cl.$^7$ ............... H04Q 7/20; H04B 17/00; G05B 23/02
(52) U.S. Cl. ............... 455/435; 455/421; 455/67.1; 340/825.44; 340/825.06
(58) Field of Search ............... 455/435, 423, 455/425, 412, 67.1, 67.7, 421, 432; 340/825.44, 825.06, 825.15; 375/358; 370/465, 252; 714/746, 748, 749

(56) References Cited

U.S. PATENT DOCUMENTS

| 4,941,203 | * | 7/1990 | Patsiokas | 455/517 |
| 5,134,708 | * | 7/1992 | Marui et al. | 455/421 |
| 5,444,765 | * | 8/1995 | Marui et al. | 455/432 |
| 5,450,613 | * | 9/1995 | Takahara et al. | 455/517 |

(List continued on next page.)

OTHER PUBLICATIONS

Motorola, "Page Finder User's Guide", pp. 1–16.
Skytel, "Sky World Plus—Store and Deliver Paging", 1997, product literature #1.
Skytel, "Sky World Plus—Get Skytel. Get the Message", 1997, product literature #2.

*Primary Examiner*—Dwayne Bost
*Assistant Examiner*—Erika A. Gary
(74) *Attorney, Agent, or Firm*—Blakely, Sokoloff, Taylor & Zafman LLP

(57) ABSTRACT

A method and apparatus for service level recognition and registration processing in a wireless communication device are provided. According to one aspect of the present invention, a method is provided for transitioning between service modes and indicating a current service mode to a user of a wireless communication device. The status of a signal associated with a forward channel from a messaging system to the wireless communication device is determined. A quality metric is determined based upon the status over a predetermined period of time. Three service modes, including a full service mode, a basic service mode, and a storing service mode are provided. In the storing service mode, after determining the quality metric is better than a first predetermined threshold a transition is made to the basic service mode. In the basic service mode, after verification of a reverse channel from the wireless communication device to the messaging system a transition is made to the full service mode. In the full service mode if the reverse channel becomes degraded, then a transition is made to the basic service mode. The current service mode is indicated to the user. According to another aspect of the present invention, a wireless communication device performs registration processing based upon the current service mode of the wireless communication device. Three service modes are recognized, including: a storing service mode in which new messages destined for the wireless communication device are not received by the wireless communication device; a basic service mode in which new messages destined for the wireless communication device are received by the wireless communication device, and a full service mode in which both new messages and stored messages are received by the wireless communication device. A registration process determines what action to take based upon the current service mode.

9 Claims, 13 Drawing Sheets

U.S. PATENT DOCUMENTS

| | | | |
|---|---|---|---|
| 5,493,692 | * 2/1996 | Theimer et al. | 455/26.1 |
| 5,546,394 | 8/1996 | Eaton et al. | 370/79 |
| 5,574,973 | * 11/1996 | Borth et al. | 455/535 |
| 5,592,471 | 1/1997 | Briskman | 455/52.3 |
| 5,625,881 | 4/1997 | Sandler et al. | 455/38.3 |
| 5,732,347 | * 3/1998 | Bartle et al. | 455/421 |
| 5,822,694 | * 10/1998 | Coombes et al. | 455/433 |
| 5,878,351 | * 3/1999 | Alanara et al. | 455/466 |

* cited by examiner

SERVICE LEVEL INDICATION AND REGISTRATION PROCESSING IN A WIRELESS COMMUNICATION DEVICE

This application claims the benefit of U.S. Provisional Application No. 60/060,416 filed Sep. 30, 1997.

FIELD OF THE INVENTION

The invention relates generally to the field of wireless communications. More particularly, the invention relates to a method of recognizing a service area in which the wireless communication device is located and indicating the current service level to the user of a wireless communication device and a method of registering the wireless communication device with a messaging system.

BACKGROUND OF THE INVENTION

Communications systems generally transfer information between a source and a destination. An exemplary two-way communication system 100 is illustrated by FIG. 1A. The communication system 100 includes a network 110 (e.g., a paging system or other messaging system) and a wireless communication device 120 (e.g., a pager or other mobile wireless communication device). The communication system 100 also includes a transmitter, such as base transmitter 111, and a receiver, such as base receiver 112, which transmit and receive information signals over some media, respectively. This media may be cable wiring or the atmosphere, for example. When communications occur over the atmosphere, or air waves, they are commonly referred to as "wireless" communications. Examples of wireless communications systems include digital cellular, packet data paging, digital cordless telephones, wireless modems, wireless local and wide area networks, digital satellite communications and personal communications networks.

Returning to FIG. 1A, the base transmitter 111 is typically mounted to a tower that is 120 to 800 feet high and is significantly more powerful than the transmitter of the wireless communication device 120 which is typically located approximately 3 feet from the ground. Consequently, the distance at which reliable message exchange can take place from the base transmitter 111 to the wireless communication device 120, labeled R1, is much greater than the distance at which reliable message exchange can take place from the wireless communication device 120 to the base receiver 112, labeled R2. Therefore, one of the many challenges faced by designers of communications systems and wireless communication devices is how to resolve the imbalance in bit-error rates between the forward channel (i.e., the path from the network 110 to the wireless communication device 120) and the reverse channel (i.e., the path from the wireless communication device 120 to the network 110).

One prior technique for balancing the in-bound and out-bound bit-error rates in a two-way paging system is illustrated by FIG. 1B. According to this technique, the problem is solved with an appropriate network design. In this example, the network topology is designed such that whenever a wireless communication device 120 is within range of a base transmitter 111, it will also be within range of a base receiver 112. However, it should be appreciated this solution is extremely costly. Further, since occasional lapses in coverage on the reverse channel are tolerable for pager users, the additional expense to make the forward and reverse channel coverage areas identical is not cost effective.

What is desirable, therefore, rather than additional receivers per transmitter, is a mechanism for distinguishing between the various coverage combinations and for effectively conveying the current service level (e.g., the current capabilities of the wireless communication device) to the user. Advantageously, in this manner, the user of the wireless communication device will have the appropriate expectation of his/her current ability to originate and/or receive messages by way of the wireless communication device. Additionally, it is desirable to use this same mechanism as a foundation for the wireless communication device's registration processing.

SUMMARY OF THE INVENTION

A method and apparatus for service level recognition and registration processing in a wireless communication device are described. According to one aspect of the present invention, the current service level of a wireless communication device is determined. Three distinct levels of service are provided including a first level of service, a second level of service, and a third level of service. The method distinguishes between the first service level and the second service level based upon one or more characteristics of a forward channel from a messaging system to the wireless communication device. The method further distinguishes between the second service level and the third service level based upon one or more characteristics of a reverse channel from the wireless communication device to the messaging system.

According to another aspect of the present invention, a method is provided for transitioning between service modes and indicating a current service mode to a user of a wireless communication device. The status of a signal associated with a forward channel from a messaging system to the wireless communication device is determined. A quality metric is determined based upon the status over a predetermined period of time. Three service modes, including a full service mode, a basic service mode, and a storing service mode are provided. In the storing service mode, after determining the quality metric is better than a first predetermined threshold a transition is made to the basic service mode. In the basic service mode, after verification of a reverse channel from the wireless communication device to the messaging system a transition is made to the full service mode. In the full service mode if the reverse channel becomes degraded, then a transition is made to the basic service mode. The current service mode is indicated to the user.

According to another aspect of the present invention, a wireless communication device performs registration processing based upon the current service mode of the wireless communication device. Three service modes are recognized, including: a storing service mode in which new messages destined for the wireless communication device are not received by the wireless communication device; a basic service mode in which new messages destined for the wireless communication device are received by the wireless communication device, and a full service mode in which both new messages and stored messages are received by the wireless communication device. A registration process determines what action to take based upon the current service mode.

Other features of the present invention will be apparent from the accompanying drawings and from the detailed description which follows.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

An improved method and apparatus for determining the current service level of a wireless communication device and for registering the wireless communication device with a messaging system is described. In the following description, for the purposes of explanation, numerous specific details are set forth in order to provide a thorough understanding of the present invention. It will be apparent, however, to one skilled in the art that the present invention may be practiced without some of these specific details. In other instances, well-known structures and devices are shown in block diagram form.

The present invention includes various steps, which will be described below. The steps may be embodied in machine-executable instructions, which may be used to cause a general-purpose or special-purpose processor programmed with the instructions to perform the steps. Alternatively, the steps may be performed by a combination of hardware and software. Importantly, while embodiments of the present invention will be described with reference to a handheld two-way pager, the method and apparatus described herein are equally applicable to other types of wireless communication devices such as cellular phones, wireless networking devices and the like.

Service Areas

In two-way communications systems, such as two-way paging systems, it should be apparent that three distinct service or coverage areas exist. As one advantage of the present invention a mechanism is disclosed for determining in which service area the wireless communication device 120 is located by evaluating characteristics of both the forward and reverse channels.

Figure 2:
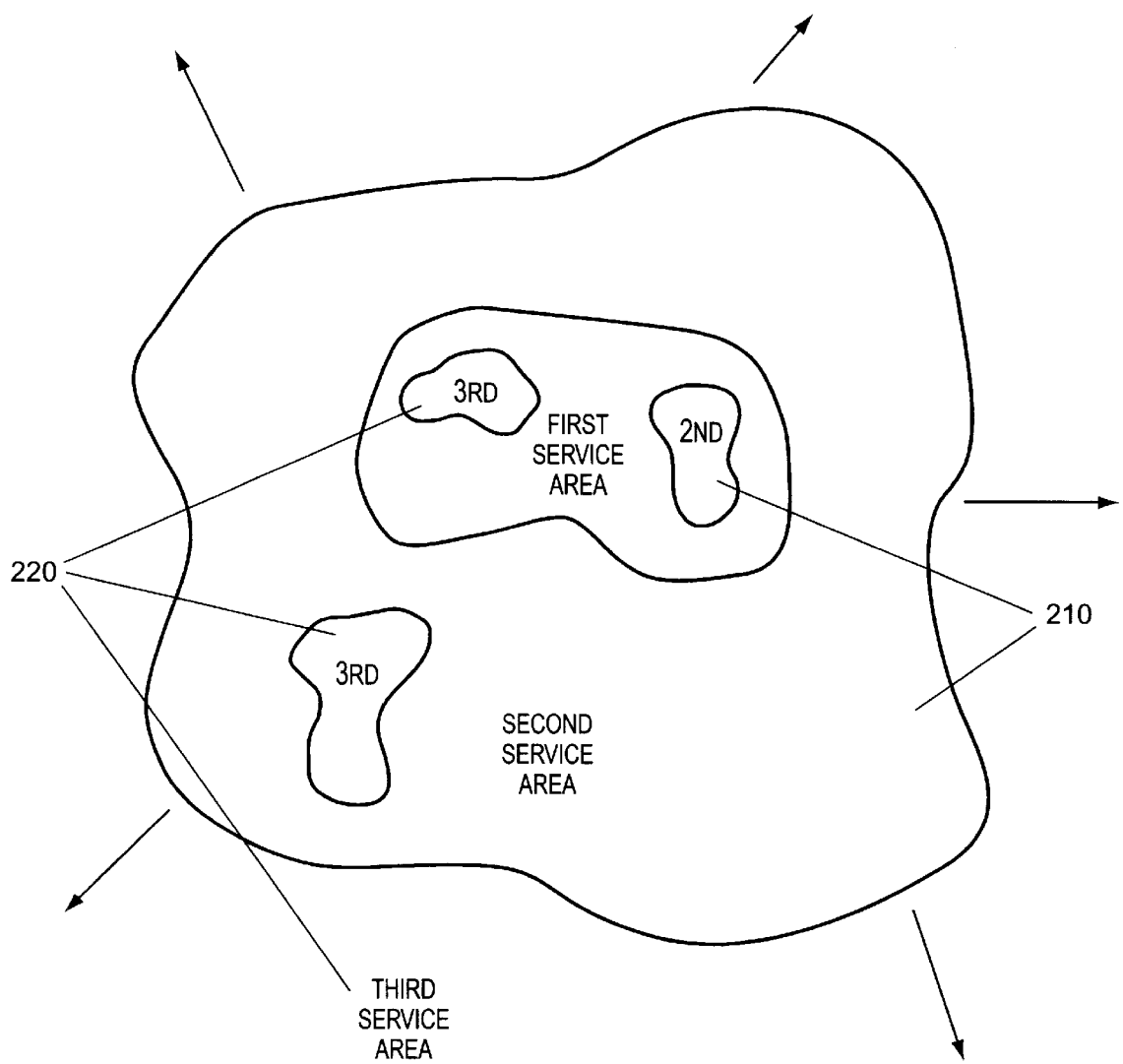
FIG. 2 illustrates three service areas among which a wireless communication device may distinguish according to one embodiment of the present invention.

The three service areas in which a two-way wireless communication device 120 may be located will now be discussed with reference to FIG. 2. In a first service area 200, the wireless communication device 120 can receive transmissions from the base transmitter 111 and the base receiver 112 can receive transmissions originated by the wireless communication device 120. This service area, therefore, represents an area in which both the base transmitter 111 and the base receiver 112 have good coverage. It is in this area that reliable two-way communications, such as two-way paging, may take place. When a wireless communication device 120 is in this service area 200 and has registered with the messaging service (as is generally required by messaging protocols involving mobile communication devices), it is said to be in "Full Service."

In a second service area 210, the wireless communication device 120 can receive transmissions from the base transmitter 111, but the base receiver 112 cannot receive transmissions originated by the wireless communication device 120. This service area, therefore, is only useful for one-way communications. When a wireless communication device 120 is in this service area 210, it is said to be in "Basic Service."

In a third service area 220, the wireless communication device 120 is incapable of receiving transmissions from the base transmitter 111 and the base receiver 112 cannot receive transmissions originated by the wireless communication device 120. As a result, neither one-way or two-way communications may take place in this service area 220. According to one embodiment, when a wireless communication device 120 is in this service area 220, it is said to be "Out of Range." However, in alternative embodiments, the message service may store undelivered messages and deliver them at a later time (e.g., upon successful registration by the wireless communication device 120), in which case the service level of the wireless communication device 120 is referred to as "Storing Service." Importantly, it should be appreciated that obstructions or other interference may cause discontinuities in the service areas. For example, one or more Storing Service or Out of Range areas may be located within the first and second service areas 200 and 210 as illustrated. The three service levels (Full, Basic, and Storing Service), and the novel mechanism for determining the appropriate state of the wireless communication device 120 is described further below.

Figure 1A:
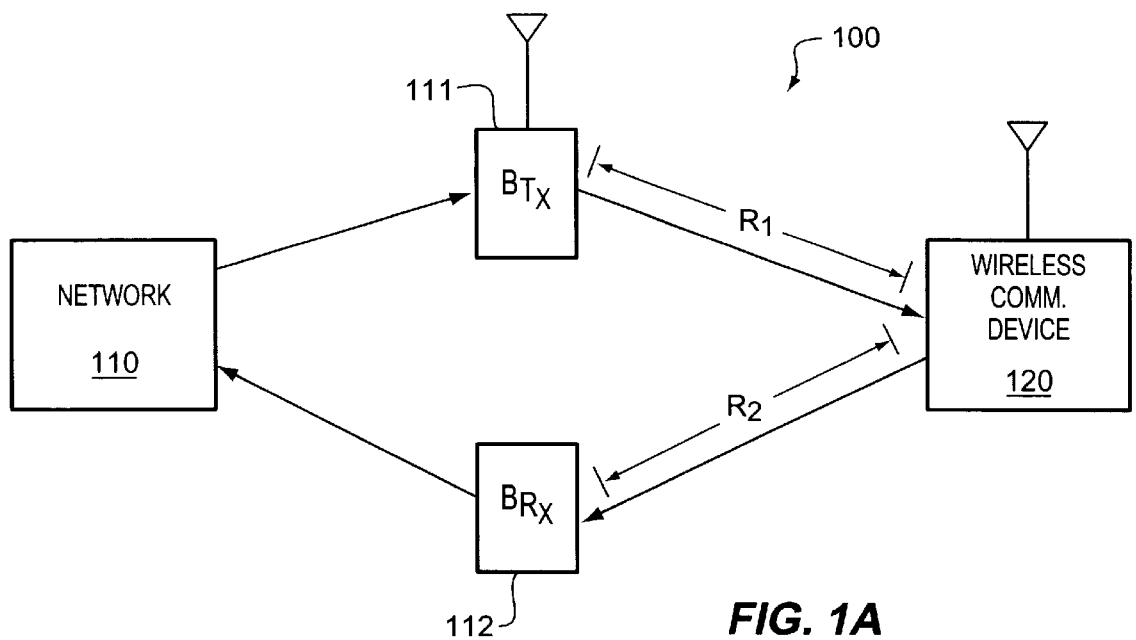
FIG. 1A illustrates an exemplary two-way communication system in which the present invention may be employed according to one embodiment of the present invention.
Figure 1B:
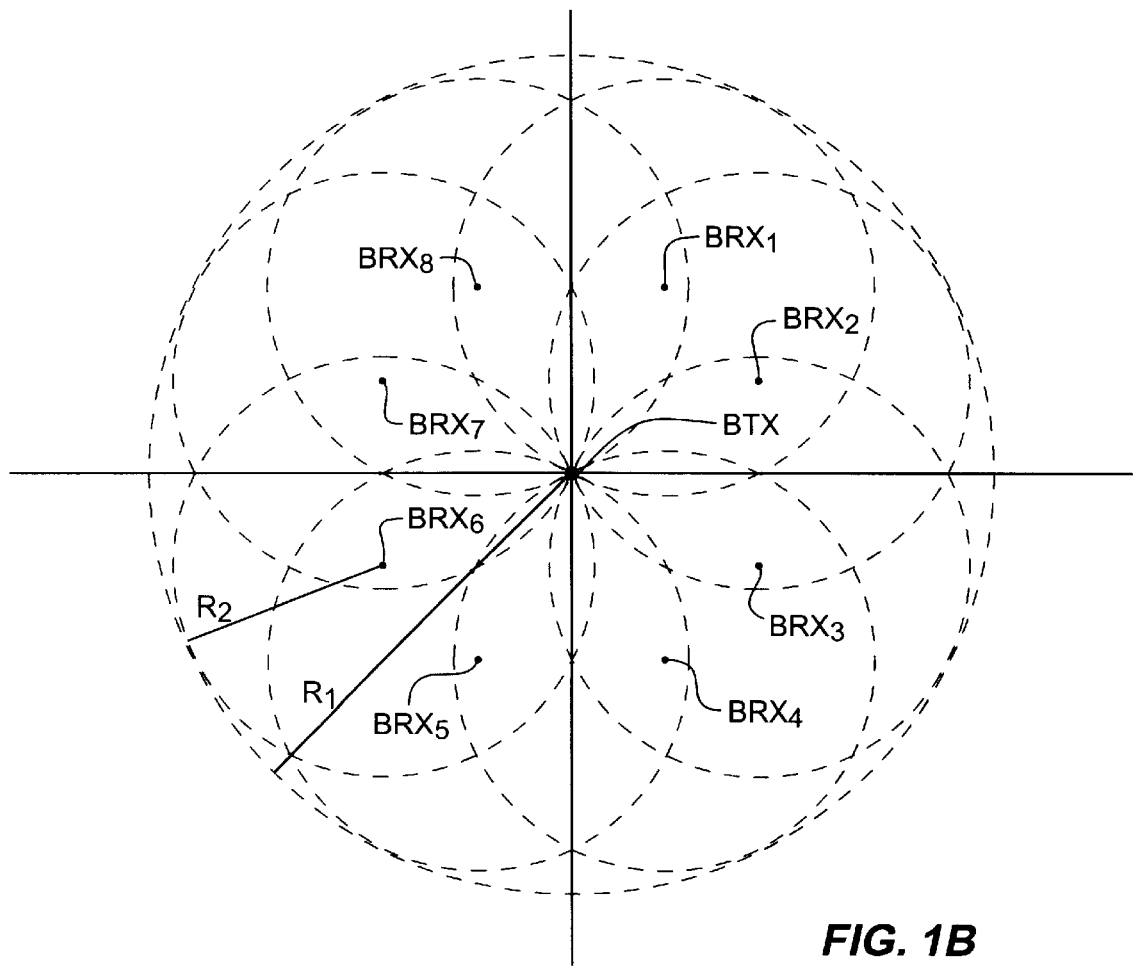
FIG. 1B is a diagram depicting a relationship between the location of a base transmitter and base receivers.

At this point, it may be instructive to compare the three service areas (200, 210, and 220) to cellular and one-way paging service areas. In a cellular communication system, because one-way voice communication is not useful, the network is designed such that R1 and R2 (of FIG. 1a) are equal. That is, the network is comprised of many first service areas 200 bumped up against each other to provide symmetric in-bound and out-bound paths. As a result, only two service areas are available. In the first, the cell phone can receive transmissions from the transmitter and the receiver can receive communications from the cell phone. However, in the second, because R1 and R2 are equal, both the transmitter and receiver are out of range. Therefore, in a cellular system, the second service area 210 and the third service area 220 are equivalent (e.g., out of range).

One-way paging systems also have only two distinct service areas (e.g., in range and out of range). In a one-way paging system, there is no reverse channel from the wireless communication device 120 to the messaging service 110. Therefore, for a one-way paging system, there is no equivalent to the first service area 200 of the two-way communication system.

In contrast to the simplistic service level determination (e.g., signal or no signal) required for cellular and one-way paging systems, the present invention provides the capability to distinguish among three distinct service areas.

An Exemplary Wireless Communication Device

Figure 3:
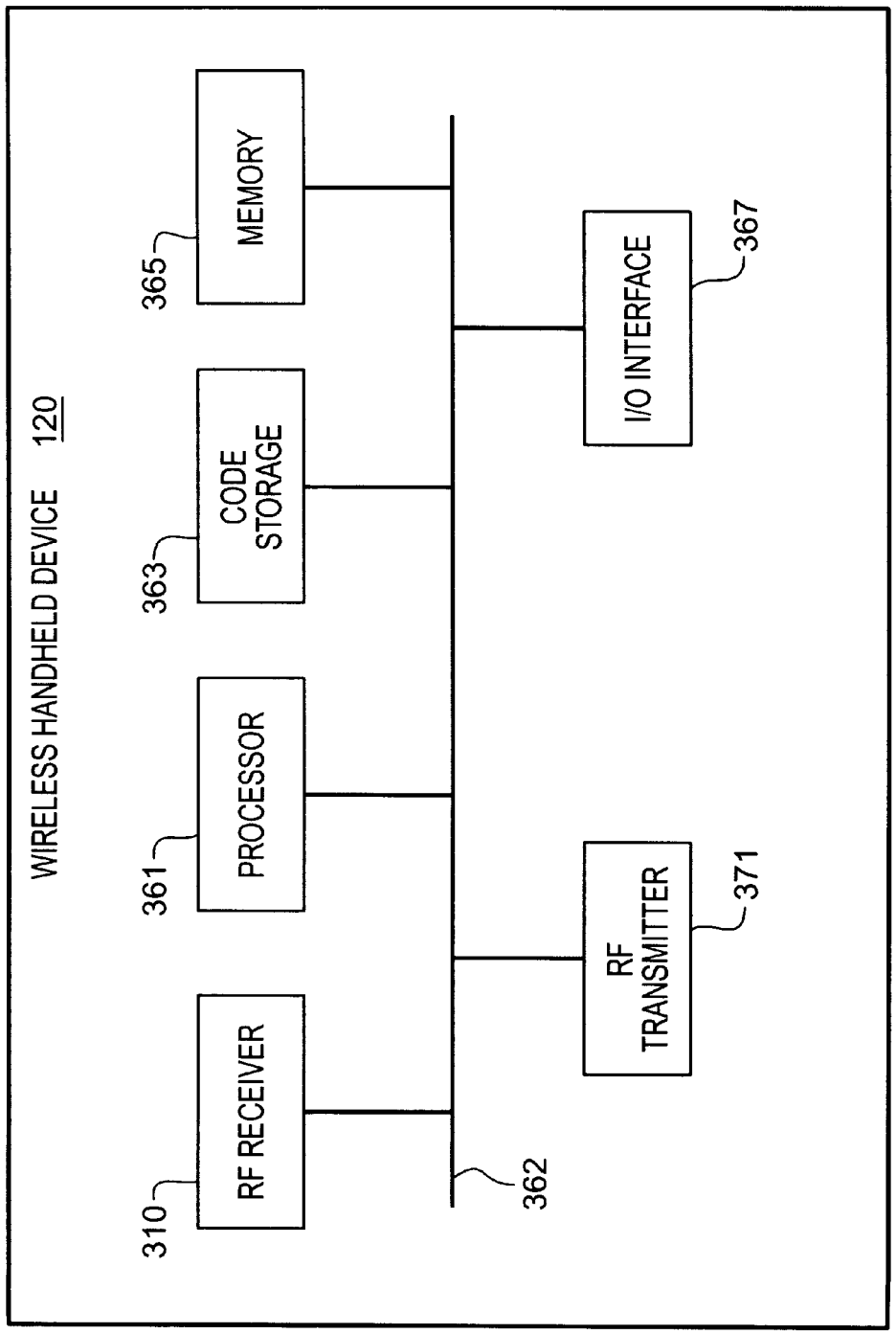
FIG. 3 illustrates an exemplary wireless communication device in which one embodiment of the present invention may be implemented.

FIG. 3 is a simplified block diagram of a handheld wireless communication device 120 in which the method of the present invention may be implemented. In the embodiment depicted, the device 120 may be a two-way electronic pager, a wireless modem, a cell telephone or any other device for receiving and transmitting RF transmissions. Device 120 includes a RF receiver 310, a RF transmitter 371, a processor 361, a non-volatile code storage 363, a memory 365, and an I/O interface 367, all intercoupled by a bus 362. According to one embodiment of the present invention, the processor 361 executes program code stored in code storage 363 to perform the processing involved in determining the wireless communication device's current level of service and the registration processing described below and other functions of the device 120. Memory 365 is used to store the results of intermediate calculations and other program variables. The I/O interface 367 will typically include an assortment of components coupled to bus 362 that varies based on the application of the device 120. For example, if device 120 is an electronic pager, I/O interface 367 would typically include a number of buttons to receive user input, a display for displaying messages and other information and a notification mechanism such as a beeper or vibrator to alert the user that a message has been received. In the case of a cell telephone, I/O interface 367 would typically include a numeric keypad, certain control buttons, a microphone and a speaker. In other applications I/O interface 367 may include other components to provide application-specific functionality.

Examples of handheld wireless communication devices in which embodiments of the present invention may be implemented include the AccessLink™ pager and the Access-Mate™ pager, both of which are manufactured by Wireless Access Inc. of Santa Clara, Calif. AccessLink™ and Access-Mate™ are trademarks of Wireless Access Inc.

Logical View

Figure 4:
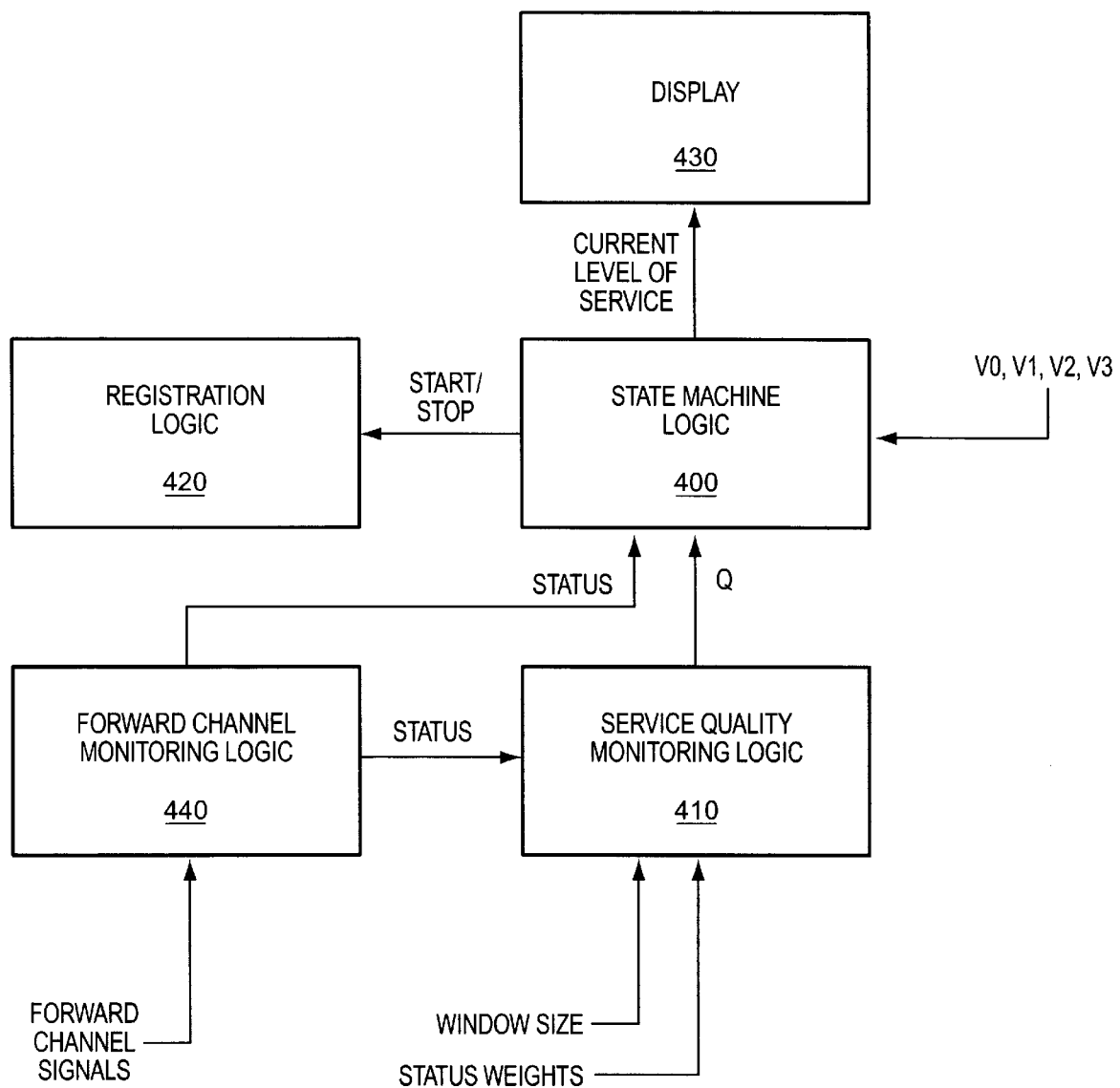
FIG. 4 is a block diagram illustrating various functional units according to one embodiment of the present invention.

FIG. 4 is a logical view illustrating various functional units provided in the wireless communication device 120 according to one embodiment of the present invention. Forward channel monitoring logic 440 receives signals from the forward channel and generates a status for use by service quality monitoring logic 410 and state machine logic 400. Exemplary status values may include representations of the following: (1) No signal, (2) synchronization error, (3) frame error, (4) good frame, (5) reverse channel acknowledgment (ACK), (6) Messaging system ping, and (7) failed message from the wireless communication device to the messaging system. Of course, more or less status values may be used in different embodiments. For example, in one embodiment, the frame error status may be further broken down into two states, one representing a frame error at a low channel speed and another representing a frame error at a high channel speed. Further, other embodiments may distinguish between good frames that are filled and good idle frames. In any event, the forward channel monitoring logic 440, in a known manner, interprets signals received over the forward channel and produces a status for each frame.

The service quality monitoring logic 410 receives status values from the forward channel monitoring logic for each frame and generates a forward channel signal quality metric for use by the state machine logic 400. The status values have corresponding weights associated with them. The weights indicate the relative healthiness of the channel. According to one embodiment, a signal quality of 0 is the best and a signal quality of 100 is the worst. Status weights, in this example, therefore, range from 0 to 100. The status of no signal may correspond to a weight of 100, synchronization error may be assigned a weight of 80, a low speed frame error status may be associated with a weight of 60, a status of high speed frame error may be assigned a weight of 40, and a status of good frame may be assigned a weight of 0. It should be appreciated that the weight associated with a particular status may be hardcoded or may be provided as a programmable parameter, and such programmability may include over-the-air programmability. In any event, in one embodiment, the forward signal quality metric (hereinafter "Q") is a moving average of the weights associated with the status values over a predetermined window of frames and is calculated as follows:

$$Q = \frac{\sum_{i=1}^{N} Weight_i}{N}$$

where, N is the number of frames in the window, which may also be programmable (e.g., code plug). As will be appreciated, a moving average is desirable to minimize the effect of short-term fluctuations in the forward channel signal on the current level of service indicated to the user of the wireless communication device 120. However, various other ways of determining an appropriate forward channel signal quality metric will be apparent to those of ordinary skill in the art.

The state machine logic 400 maintains a current state of the wireless communication device corresponding to the current service level. The state machine logic 400 additionally controls the transition between states of a state machine, discussed below, based upon one or more factors, such as one or more forward channel signal quality thresholds, a forward channel signal quality metric, and the status of the forward channel. According to the embodiment depicted, the state machine logic 400 receives four inputs (V0, V1, V2, and V3) representing forward channel signal quality thresholds. As discussed further below, depending upon the current state, the relationship between Q and one or more of the forward channel signal quality thresholds, and the status of the forward channel, the state machine logic 400 may transition from one state to another causing the current state to be updated. Further, the transition from one state to another may or may not trigger some additional processing, such as updating the display, starting or stopping registration processing, re-initializing the service quality monitoring logic 410, etc.

Importantly, functional units 400, 410, 420, and 440 may be implemented in hardwired circuitry, by programming a general purpose processor, or by any combination of hardware and software/firmware. For example, according to one embodiment, the state machine logic 400 is implemented in firmware which resides in code storage 363 and is executed by processor 361.

Exemplary State Machine

Figure 5:
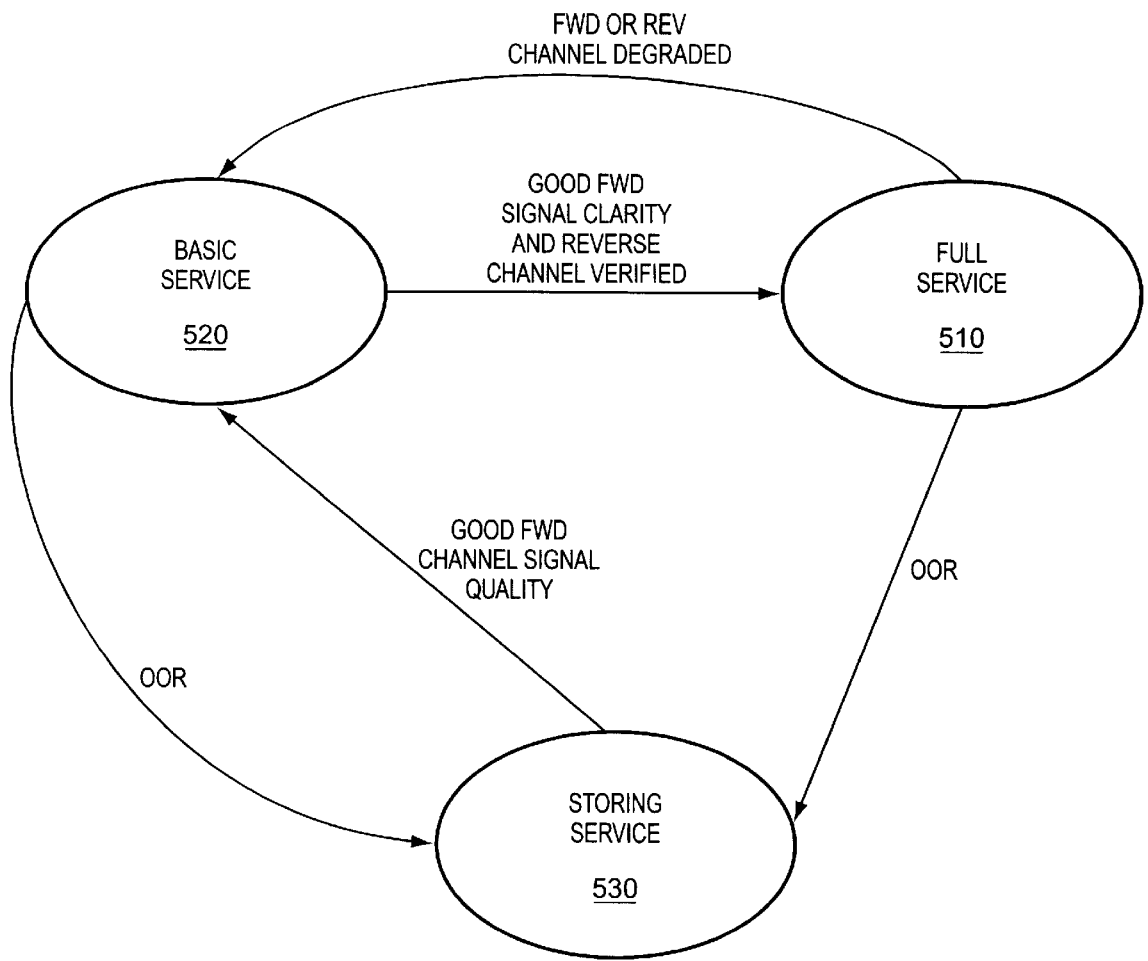
FIG. 5 is a state diagram illustrating three states in which a wireless communication device may be according to one embodiment of the present invention.

According to one embodiment three service levels are supported by the wireless communication device 120 and an indication is provided to the user identifying the device's current service level. FIG. 5 is a state diagram illustrating three states in which a wireless communication device may be according to one embodiment of the present invention. According to the embodiment depicted, the wireless communication device may be in a full service state 510, a basic service state 520, or a storing service state 530.

In the storing service state 530, the wireless communication device 120 is outside of the messaging system's coverage area and all new messages are stored until the pager returns to a full service coverage area. The wireless communication device 120 may transition to the basic service state 520 when the forward channel signal quality is determined to be better than a predetermined threshold quality.

In the basic service state 520, all new messages will be received, but not any undelivered, stored messages. According to one embodiment, stored messages may be retained by the messaging system until full service is achieved. The wireless communication device 120 may fall back to the storing service state 530 if the forward channel monitoring logic 440 indicates a status of out of ranges. The wireless communication device 120 may advance to the full service state 510 if a sufficiently good forward channel signal quality is maintained and after the reverse channel has been verified.

In the full service state 510 the wireless communication device 120 is in prime range. Both the forward and reverse channels have been verified to be of sufficient quality to support two-way communications. The user will receive all new messages and any undelivered messages that may have been stored. The wireless communication device 120 may return to the basic service state 520 if the forward or reverse channels become degraded. Further, the wireless communication device 120 may fall back to the storing service state 530 after receiving an indication from the forward channel monitoring logic 440 that the wireless communication device 120 is out of range.

Figure 6:
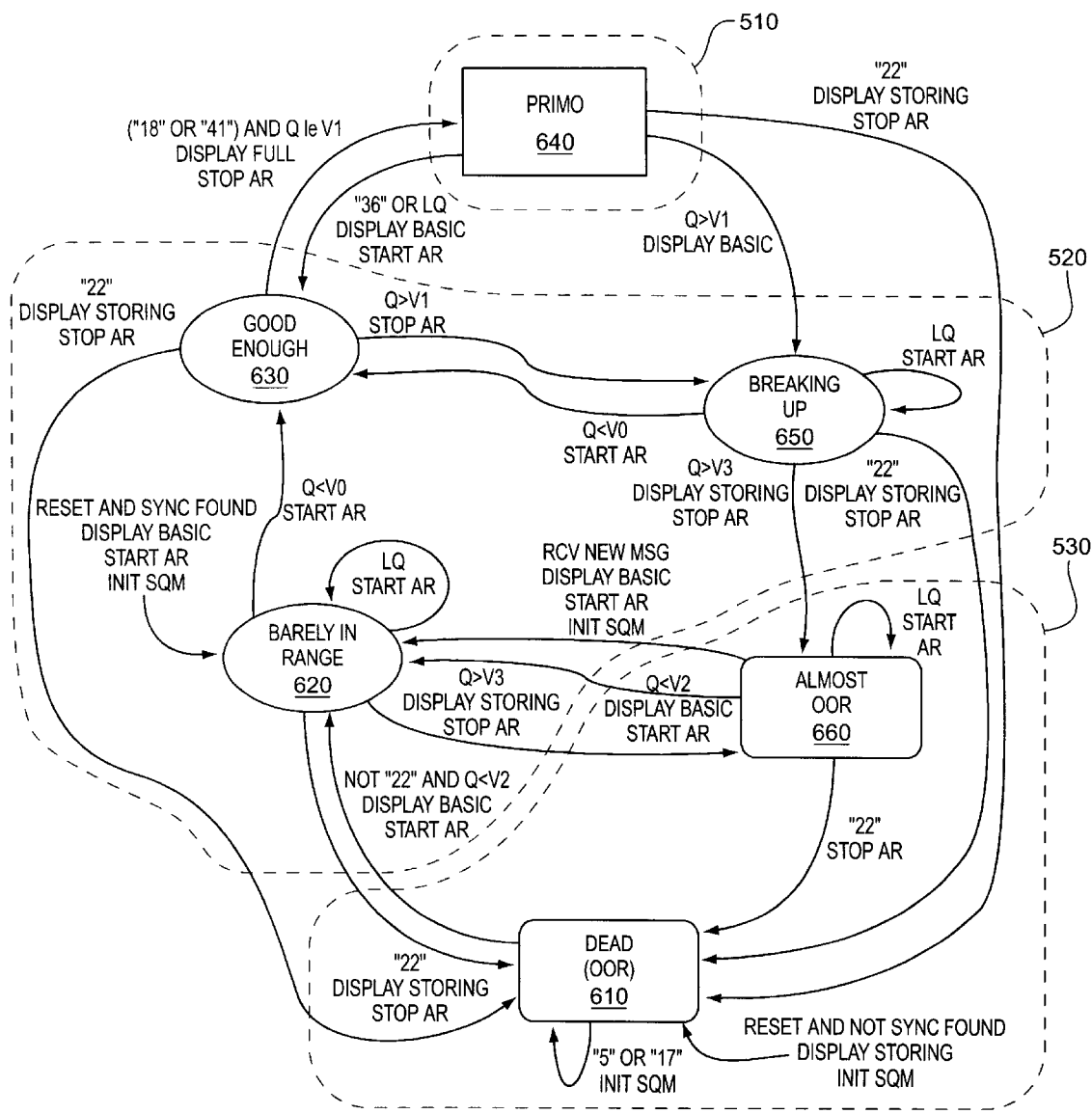
FIG. 6 is a more detailed diagram of the states of FIG. 5 according to one embodiment of the present invention.

FIG. 6 is a more detailed diagram of the states of FIG. 5 according to one embodiment of the present invention. As above, arrows from one state to another represent a transition from the source state to the destination state. Actions that trigger the transition between the states are indicated above a horizontal line and the one or more actions that are taken upon the transition from the source state to the destination state are listed below the horizontal line. In the embodiment depicted, the full service state 510 comprises a primo state 640, the basic service state 520 includes a barely in range state 620, a good enough state 630, and a breaking up state, the storing service state 530 includes an almost out of range state 660 and an out of range state 610.

According to the embodiment depicted, the out of range (OOR) state 610 is the initial state on reset if a synchronization signal is not found on the forward channel. The state machine logic 400 may also transition to the OOR state 610 from any other state after receiving a status of OOR from the forward channel monitoring logic 440. While the state machine is in this state an indication is provided to the user that the wireless communication device 120 is in storing service. For example, a message, such as "Storing Messages," "Storing," or similar message may be shown on a portion of the display. While in this state, if the forward channel monitoring logic 440 indicates good frames are detected on the forward channel, then the service quality monitoring logic 410 is re-initialized. In this manner, the past history of Q is essentially erased and the state machine can more quickly transition out of the OOR state 610 upon improvement in the forward channel's signal quality. Typically, in this state, Q ranges between signal quality values that are worse than V3 to V2. Once Q is better than V2 and a status other than OOR is received from the forward channel monitoring logic 440 the state machine may transition to the barely in range (BIR) state 620.

The BIR state 620 represents a state in which the state machine has obtained a certain level of confidence in the quality of the forward channel. In this embodiment, the BIR state 620 is the initial state on reset if a synchronization signal is found on the forward channel. Other transitions to the BIR state 620 generally represent an increase in the level of confidence in the quality of the forward channel. While the state machine is in this state, an indication is provided to the user that the wireless communication device 120 is in basic service. For example, a message, such as "Basic Service," "Basic," or similar message may be shown on a portion of the display. Typically, in this state, Q ranges between signal quality values of V3 to V0. After the signal quality has been determined to be better than V0, the state machine logic 400 transitions to the good enough state 630.

In this embodiment, the good enough state 630 is one transition away from the Primo state 640. In this state, very good signal quality on the forward channel has been achieved, but the reverse channel remains to be verified. While the state machine is in the Good Enough state 630, the user is provided with an indication that the wireless communication device 120 is in basic service. In this state, Q is typically better than V0 and no worse than V1. If the signal quality falls below V1, the state machine logic 400 transitions to the breaking up state 650. If the signal quality remains above or equal to V1 and the reverse channel is verified (e.g., by way of a reverse channel ACK or a registration ACK), then the state machine logic 400 transitions to the Primo state 640.

According to the embodiment depicted, the Primo state 640 represents a state in which very good signal quality on the forward channel has been achieved and additionally the reverse channel has been verified. In this state, the user is provided with an indication that the wireless communication device 120 is in full service. For example, a message, such as "Full Service," "Full," or similar message may be shown on a portion of the display. In this embodiment, Q ranges for the Primo state 640 are better than V0 to V1. Once the forward channel signal quality has degraded enough such that Q is worse than V1, the state machine logic 400 transitions to the breaking up state 650. Other transitions from this state occur when there is an indication that the reverse channel has degraded (e.g., a messaging system ping is received, such as a location query or a message from the wireless communication device 120 to the messaging system failed), the forward channel has degraded (e.g., the forward channel signal quality has caused Q to become worse than V1), or the forward channel has been lost (e.g., the forward channel monitoring logic 440 indicates a status of OOR). If it is the case that the reverse channel has degraded, the state machine logic 400 transitions back to the good enough state 630. In the situation that the forward channel has merely been degraded, then the state machine logic 400 transitions to the breaking up state 650. Finally, if it is the case that an OOR status has been received, the state machine logic 400 transitions to the OOR state 610.

The breaking up state 650 is two transitions away from the Primo state 640. This state is entered from the Primo state 640 or the good enough state 630 when Q becomes worse than V1. In this state, the user is provided with an indication that the wireless communication device 120 is in basic service. According to this embodiment, Q ranges from V3 to V0 for the breaking up state 650. If Q becomes better than V0, the state machine logic 400 may transition to the good enough state 630. If Q becomes worse than V3, the state machine logic 400 may transition to the almost OOR state 660.

In the embodiment depicted, the almost OOR state 660 represents a state in which very poor signal quality on the forward channel has been experienced. When the state machine is in either the BIR state 620 or the breaking up state 650 and the forward channel signal quality has degraded enough for Q to be worse than V3, then the state machine logic 400 transitions into this state. While the state machine is in the Almost OOR state 660, the user is provided with an indication that the wireless communication device 120 is in storing service. Q values for this state range from worse than V3 to V2. When the forward channel becomes healthy (e.g., the forward signal quality is healthy for long enough for Q to become better than V2 or a new message is received), then the state machine logic's current state is upgraded to the BIR state 620. However, if the forward channel monitoring logic 440 indicates a status of OOR, then the state machine logic's current state is downgraded to the OOR state 610.

From the above description, it should be appreciated that one feature of the present embodiment is the fact that the boundaries between the states, in terms of the forward channel signal quality thresholds that need to be achieved to transition between states, provide a graceful hysteresis mechanism to prevent a mobile device from bouncing back and forth between states.

Registration Processing

The present invention further provides a registration mechanism that achieves a balance between the usage of the wireless communication device's battery with the user's perceived service level. For example, when the a forward channel signal quality metric is better than a predetermined threshold, the registration processing aggressively tries to register the wireless communication device 120 with the messaging system in order to achieve full service. Additionally, if the forward channel signal quality metric is worse than a predetermined threshold, battery power is conserved by discontinuing registration attempts until the forward channel signal quality improves.

FIGS. 7A–7G provide a flow diagram illustrating a method of registration processing according to one embodiment of the present invention. According to the embodiment depicted, registration processing begins with step 701. At step 701, the current state of the state machine logic 400 is tested. Based upon the current state, registration processing appropriate for that state is performed. If the current state is OOR, then OOR processing is performed at step 702. If the current state is barely in range, then barely in range processing is performed at step 703. If the current state is good enough, then good enough processing is performed at step 704. If the current state is primo, then primo processing is performed at step 705. If the current state is breaking up, then breaking up processing is performed at step 706. If the current state is almost OOR, the almost OOR processing is performed at step 707. Upon completion of the appropriate registration processing, the process continues again with step 701.

Figure 7A:
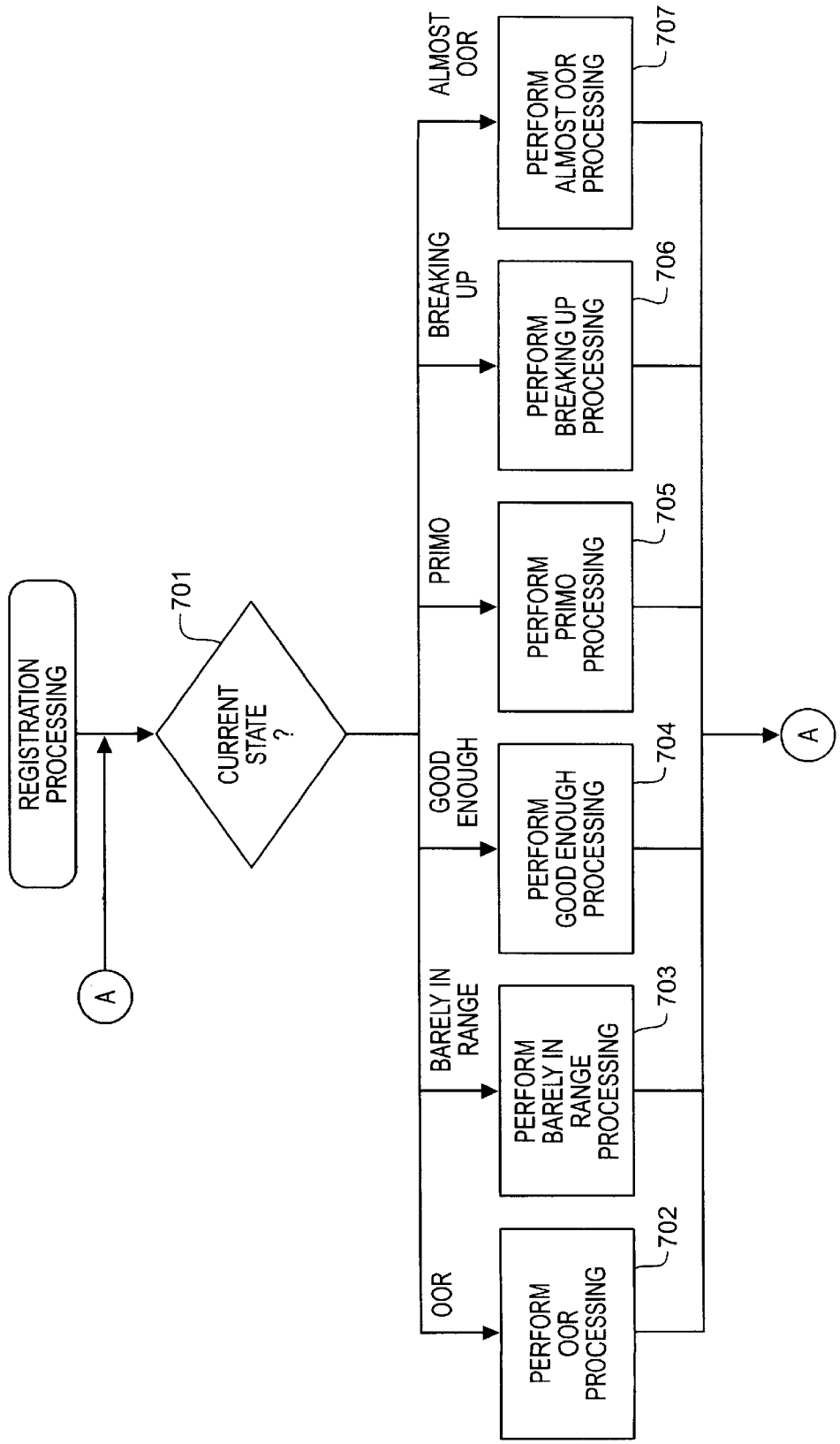
FIGS. 7A–7G are a flow diagram illustrating a method of registration processing according to one embodiment of the present invention.
Figure 7B:
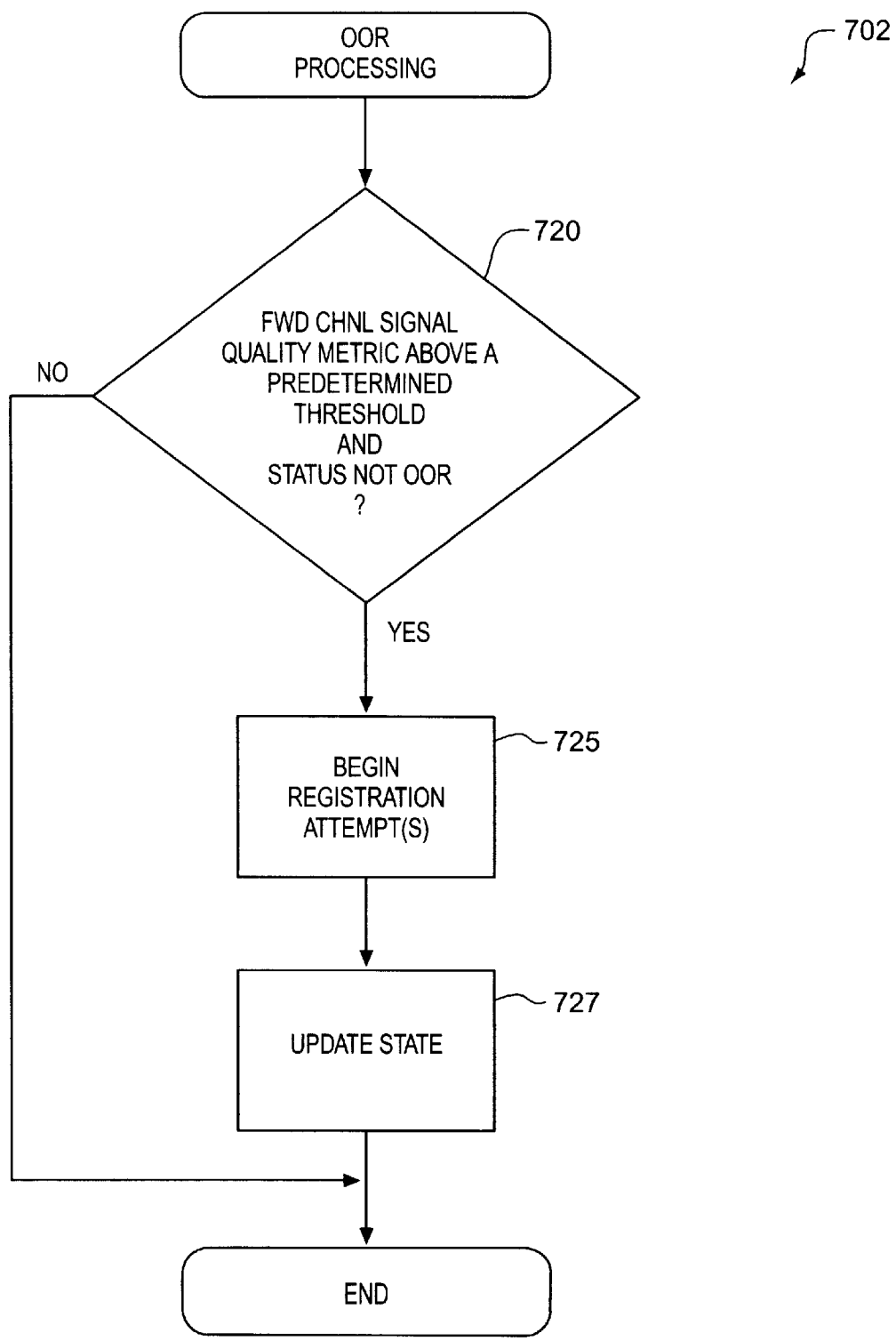

Referring now to FIG. 7B, exemplary OOR processing will now be described. At step 720, it is determined if a forward channel signal quality metric (e.g., Q) is above a predetermined threshold (e.g., V2) and if the status of the forward channel, as indicated by the forward channel monitoring logic 440, for example, is not out of range. If both conditions are met, then registration with the messaging system in a manner appropriate for the communication protocol may commence at step 725. Otherwise, registration with the messaging system is not attempted. At step 727, the state machine logic 400 updates its current state to barely in range.

Figure 7C:
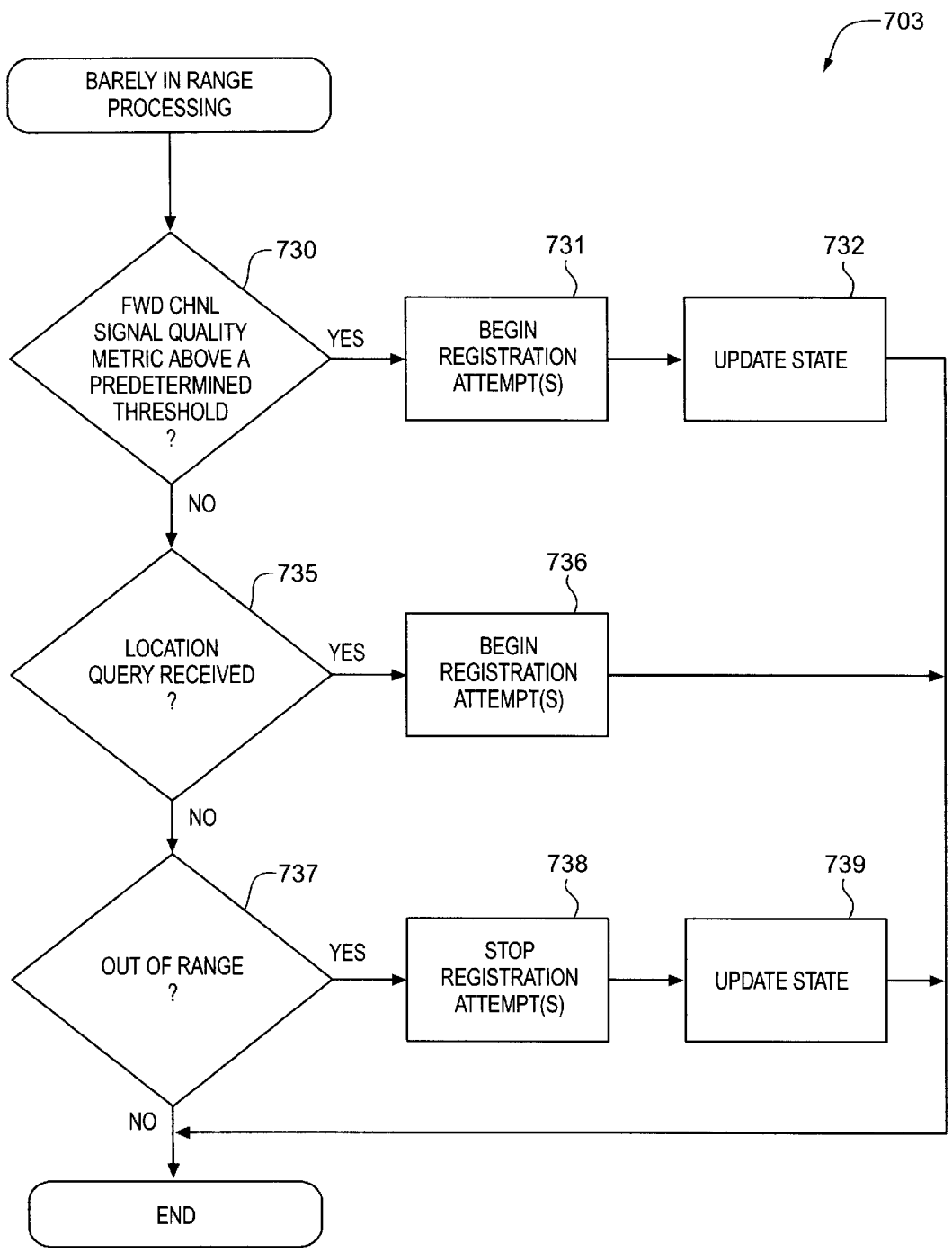

Exemplary barely in range processing is described with respect to FIG. 7C. At step 730, the forward channel signal quality metric is compared against a predetermined threshold (e.g., V0). If the metric is better than the predetermined threshold registration attempts begin at step 731 and at step 732 the current state is updated to good enough. However, if the metric is not better than the predetermined threshold, then it is determined whether or not a messaging system ping, such as a location query, has been received at step 735. If such a messaging system ping has been received, this is an indication that the messaging system is storing messages destined for the wireless communication device 120, and registration attempts may begin at step 736. If no messaging system pings have been received, processing may continue to step 737 where it is determined if the status indicated by the forward channel monitoring logic 440 is out of range. If the wireless communication device 120 is out of range, processing continues with step 738; otherwise barely in range processing is complete. At step 738 registration attempts are halted as the messaging system would not receive them and transmission would thus be a waste of battery power. Because the wireless communication device is now known to be out of range, the current state is updated to OOR.

Figure 7D:
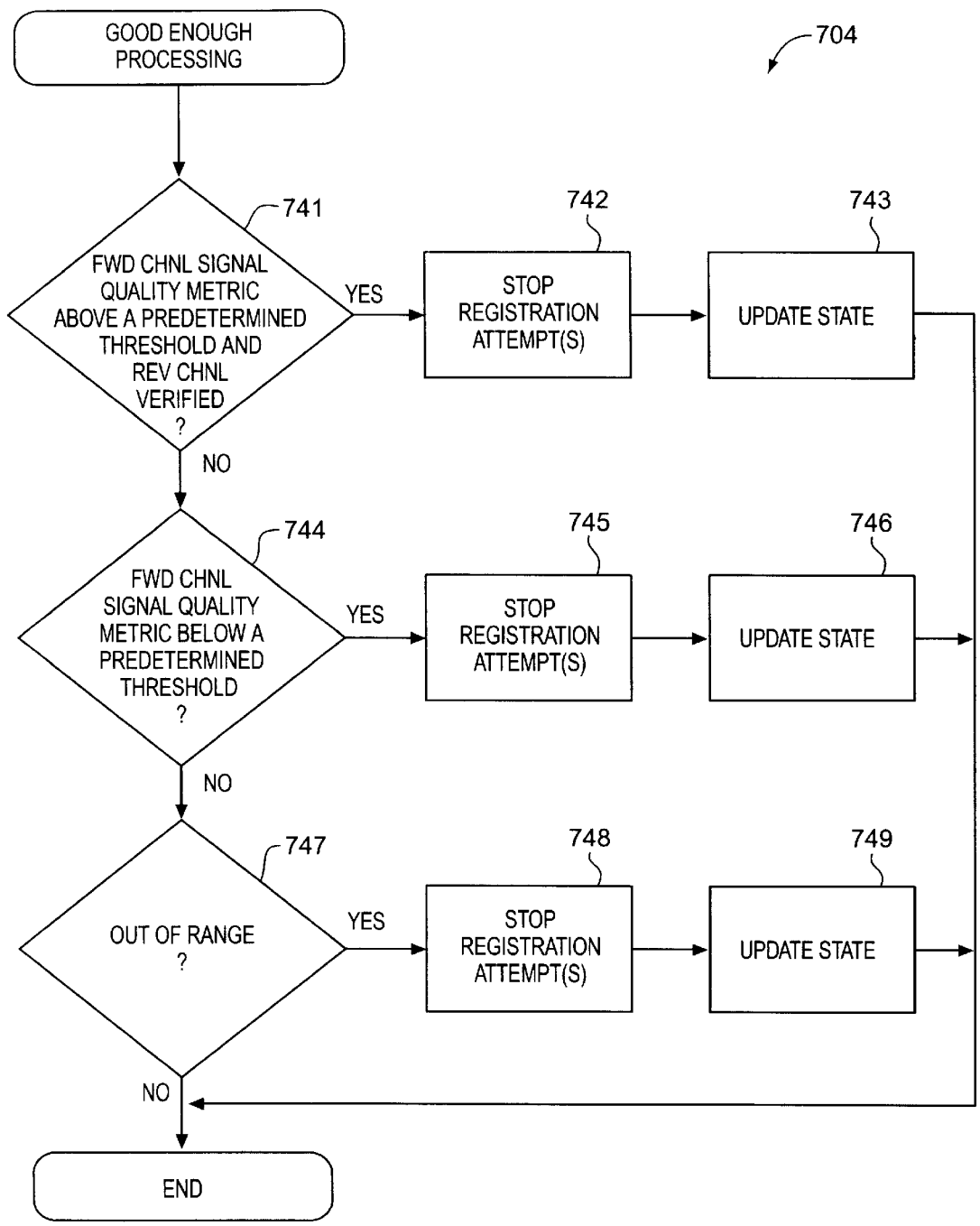

FIG. 7D is useful for describing exemplary good enough processing. According to this embodiment, at step 741, the forward channel signal quality metric is compared to a predetermined threshold, such as V1. Additionally, a determination is made as to whether the reverse channel is sufficient for two-way communications. If the forward channel signal quality metric is better than or equal to the predetermined threshold and the reverse channel has been verified by the reception of an ACK from the messaging system, then registration attempts may cease at step 742 because the wireless communication device 120 has completed registration with the messaging system. At step 743, the current state is upgraded to primo.

If one of the conditions of step 741 are not met, then at step 744 the forward channel signal quality metric is tested to determine if it is worse than a predetermined threshold, such as V1. If the condition of step 744 is met, then processing continues with step 745; otherwise with step 747. At step 745, registration attempts are halted because the level of the forward channel signal quality does not justify further attempts. At step 746, the current state is downgraded to breaking up.

At step 747, if the forward channel monitoring logic 440 indicates the forward channel is out of range, then processing continues with step 748; otherwise good enough processing is complete. Registration attempts are stopped at step 748 and the current state is updated to OOR at step 749.

Figure 7E:
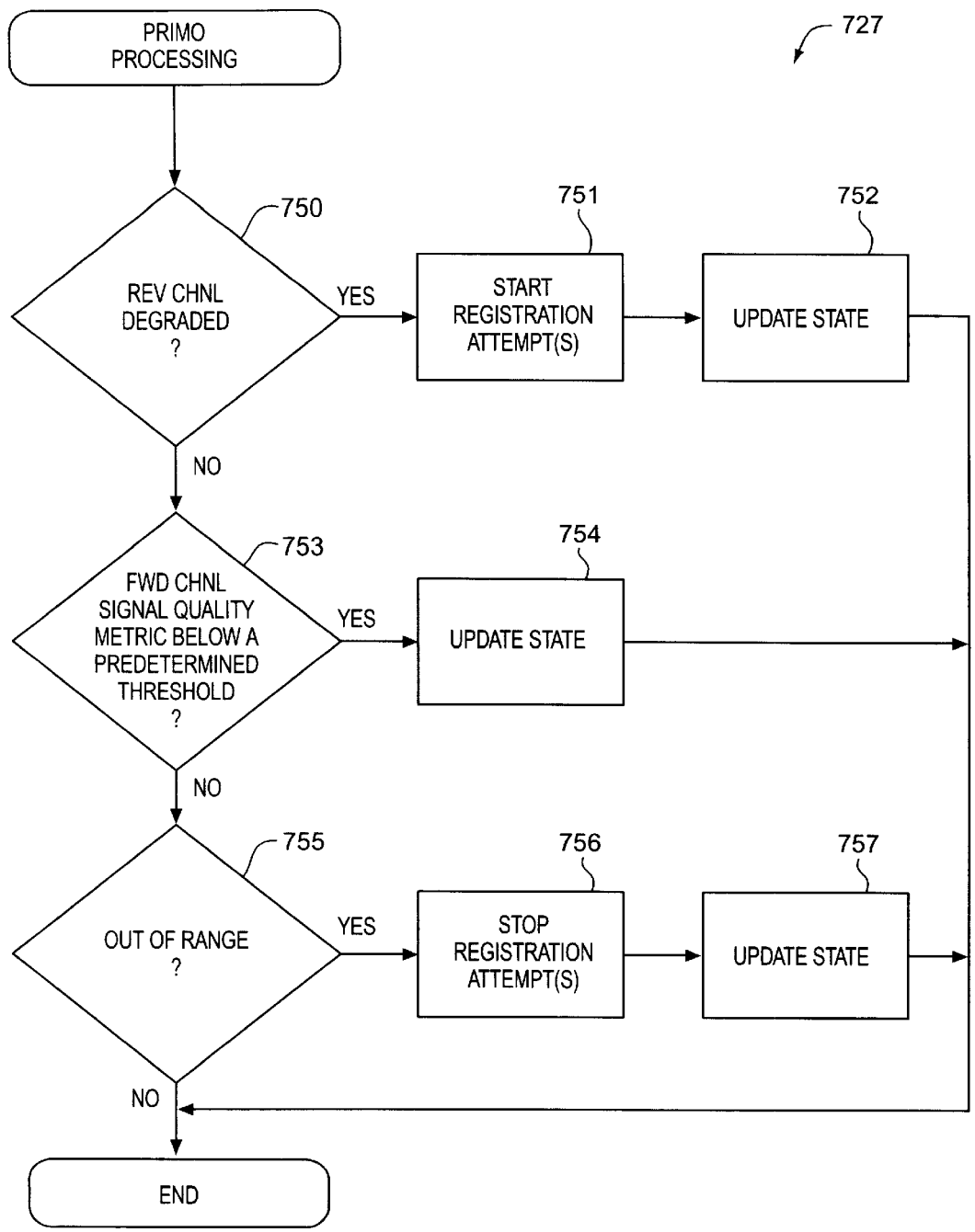

Referring now to FIG. 7E, exemplary primo processing will now be described. If it is determined at step 750 that the reverse channel has degraded (e.g., system ping received or failed message), then processing continues with step 751. Since the forward channel signal quality remains good, registration attempts are resumed at step 751 to again achieve primo status. In the meantime, the current status is downgraded to good enough at step 752.

If there is no indication of reverse channel problems, the forward channel signal quality metric is tested at step 753. If the forward channel signal quality metric is worse than a predetermined threshold, such as V1, then the current state is updated to breaking up at step 754. Otherwise, at step 755, if the forward channel monitoring logic 440 indicates the forward channel is out of range, then processing continues with step 756; otherwise primo processing is complete. At step 756, registration attempts are halted. At step 757, the current state is updated to OOR.

Figure 7F:
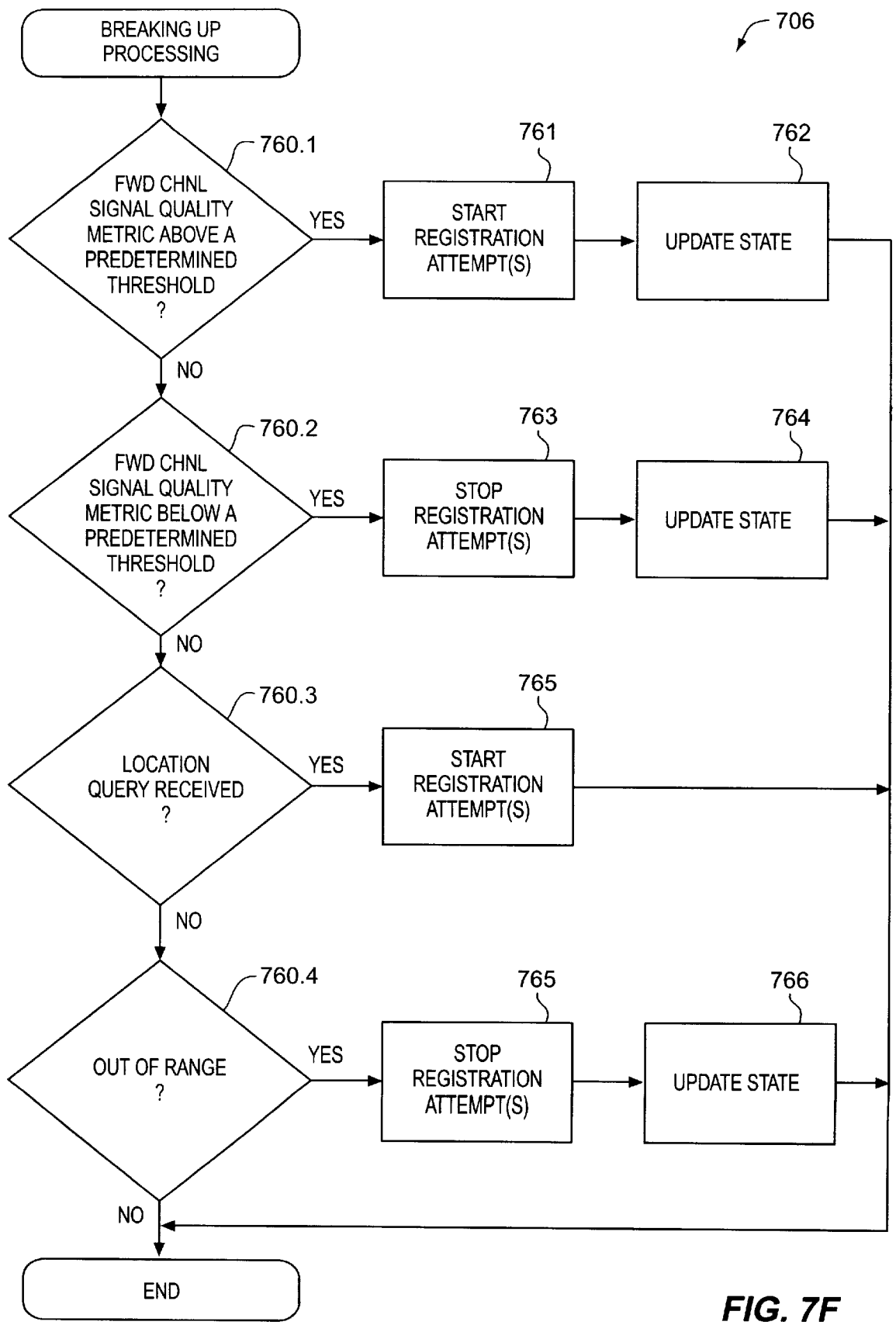

Exemplary breaking up processing is described with respect to FIG. 7F. At step 760.1, the forward channel signal quality metric is tested. If the forward channel signal quality metric is better than a predetermined threshold (e.g., V0), then processing continues with step 761. At step 761, attempts to register with the messaging system are begun. At step 762, the current state is upgraded to good enough.

If the forward channel signal quality metric is not better than the predetermined threshold, then at step 760.2, it is compared against another predetermined threshold, such as V3. If the forward channel signal quality metric is worse than V3, for example, then processing continues with step 763; otherwise processing continues with step 760.3. At step 763, registration attempts are discontinued until the forward channel signal quality metric improves. At step 764, the current state is downgraded to almost OOR.

At step 760.3, it is determined whether or not a messaging system ping, such as a location query, has been received. If so, it is likely that the messaging system is storing new messages, therefore, registration attempts are started to notify the messaging system of the wireless communication device's current location at step 765. Otherwise, at step 760.4, a determination is made as to whether the forward channel is out of range. If the forward channel monitoring logic 440 indicates the forward channel is out of range, then processing continues with step 765; otherwise breaking up processing is complete. At step 765, registration attempts are halted. At step 766, the current state is updated to OOR.

Figure 7G:
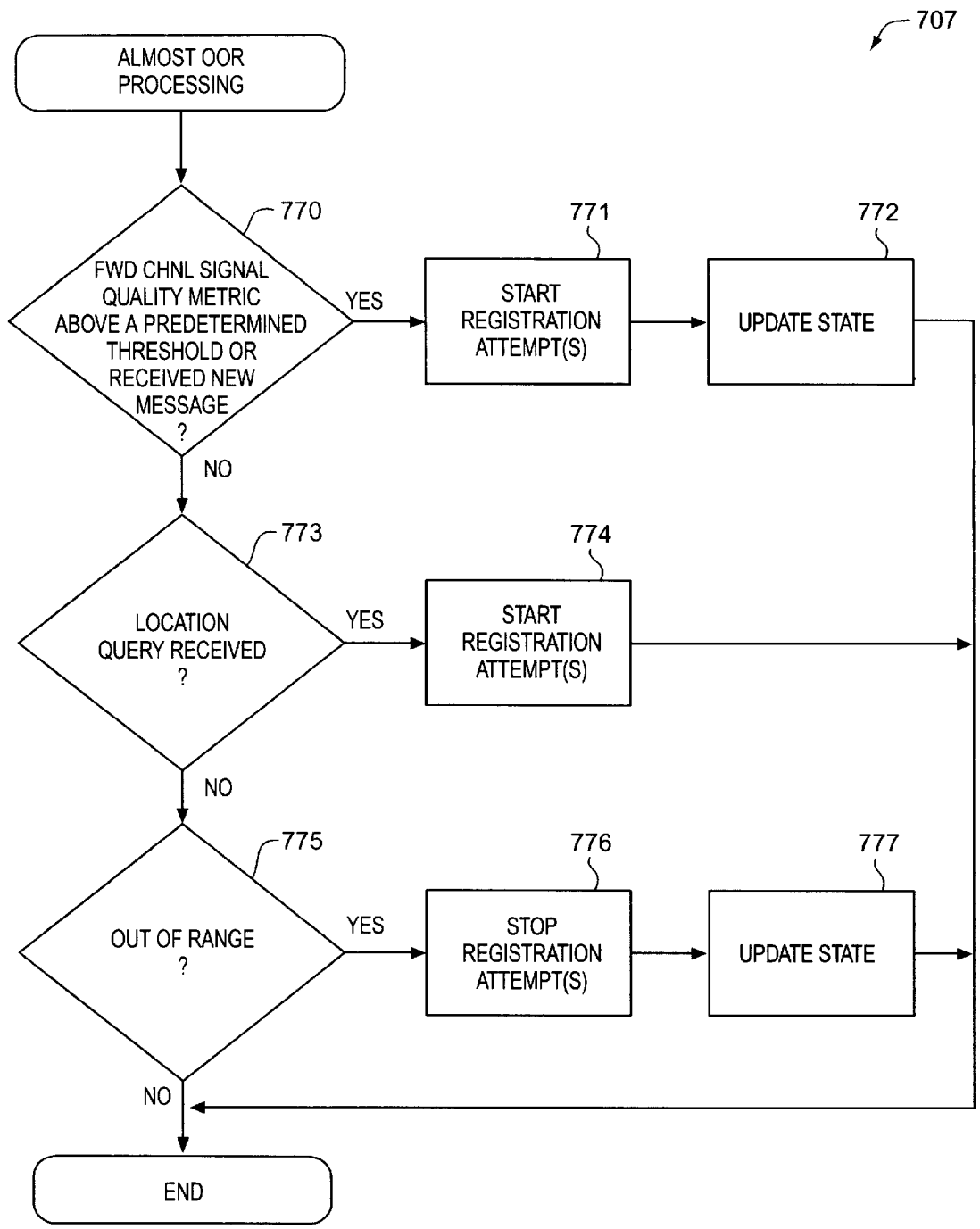

FIG. 7G is useful for describing exemplary almost OOR processing. According to this embodiment, at step 770, the forward channel signal quality metric is compared to a predetermined threshold, such as V2. Additionally, a determination is made as to whether a new message has been received. If the forward channel signal quality metric is better than the predetermined threshold or a new message has been received at the wireless communication device 120, then registration attempts may begin at step 771. At step 772, the current state is upgraded to barely in range.

If neither of the conditions of step 770 are met, then it is determined whether or not a messaging system ping, such as a location query, has been received at step 773. If such a messaging system ping has been received registration attempts may begin at step 774. Otherwise, at step 775, a determination is made as to whether the forward channel is out of range. If the forward channel monitoring logic 440 indicates the forward channel is out of range, then processing continues with step 776; otherwise almost OOR processing is complete. At step 776, registration attempts are halted. At step 777, the current state is updated to OOR.

Alternative Embodiments

Many alternative embodiments are contemplated by the inventors of the present invention. For example, the inventors envision uses of the present invention in multiprotocol wireless communication devices. By way of illustration, the multiprotocol wireless communication device, may employ the teachings of the present invention to determine the service level in one or more available protocols to decide upon a currently optimal protocol. In this manner, when the multiprotocol device is in poor coverage for one communication protocol, it may automatically switch to another protocol that has better coverage for the area.

Certain aspects of the invention described herein have equal application to various other selective call receivers, such as cellular telephones. Additionally, aspects of the present invention may have application in both Cellular Digital Packet Data (CDPD) and Global System for Mobile Telecommunication (GSM).

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method of transitioning between service modes and indicating a current service mode to a user of a wireless communication device, the method comprising:

determining a status of a signal associated with a forward channel from a messaging system to the wireless communication device;

determining a quality metric based upon the status over a predetermined period of time;

providing a full service mode, a basic service modes and a storing service mode;

if the current service mode is the storing service mode, transitioning to the basic service mode after determining the quality metric is better than a first predetermined threshold;

if the current service mode is the basic service mode, transitioning to the full service mode after verification of a reverse channel from the wireless communication device to the messaging system, if the current service mode is the full service mode, transitioning to the basic service mode after determining the reverse channel has become degraded;

providing an indication of the current service mode to the user; and determining an initial value for the current service mode by inspecting the signal for synchronization information, initializing the current service mode to the storing service mode if no synchronization information is found, and initializing the current service mode to the basic service mode if synchronization information is found.

2. A method of transitioning between service modes and indicating a current service mode to a user of a wireless communication device, the method comprising:

determining a status of a signal associated with a forward channel from a messaging system to the wireless communication device;

determining a quality metric based upon the status over a predetermined period of time;

providing a full service mode, a basic service mode, and a storing service mode;

if the current service mode is the storing service mode, transitioning to the basic service mode after determining the quality metric is better than a first predetermined threshold:

if the current service mode is the basic service mode, transitioning to the full service mode after verification of a reverse channel from the wireless communication device to the messaging system;

if the current service mode is the full service mode, transitioning to the basic service mode after determining the reverse channel has become degraded; and in the basic service mode, transitioning to the storing service mode after the status indicates the wireless communication device is out of range;

in the full service mode, transitioning to the basic service mode after determining the quality metric is worse than a second predetermined threshold; and in the full service mode, transitioning to the storing service mode after the status indicates the wireless communication device is out of range.

3. A method of transitioning between service modes and indicating a current service mode to a user of a wireless communication device, the method comprising:

determining a status of a signal associated with a forward channel from a messaging system to the wireless communication device;

determining a quality metric based upon the status over a predetermined period of time;

providing a full service mode, a basic service mode, and a storing service mode, and the storing service mode includes a first storing state and a second storing state, and the basic service mode includes a first basic state, a second basic state, and a third basic state;

if the current service mode is the storing service mode, transitioning to the basic service mode after determining the quality metric is better than a first predetermined threshold;

if the current service mode is the basic service mode, transitioning to the full service mode after verification of a reverse channel from the wireless communication device to the messaging system;

if the current service mode is the full service mode, transitioning to the basic service mode after determining the reverse channel has become degraded;

in the first storing state, re-initializing a service quality monitoring process after the status indicates a good frame has been detected on the forward channel;

in the second storing state, beginning a registration process after the status indicates a ping has been received from the messaging system on the forward channel;

in the first basic state, transitioning to the second basic state after determining the quality metric is better than a third predetermined threshold in the second basic state, transitioning to the third basic state after determining the quality metric is worse than the second predetermined threshold; and in the third basic state, transitioning to the second basic state after determining the quality metric is better than the third predetermined threshold.

4. The method of claim 3, wherein the first, second, and third predetermined thresholds are programmable parameters.

5. A method of registering a wireless communication device with a messaging system, the method comprising:

providing a current service mode in one of a plurality of states including:

a storing service mode in which new messages destined for the wireless communication device are not received by the wireless communication device, a basic service mode in which new messages destined for the wireless communication device are received by the wireless communication device and stored messages that remain undelivered as a result of the wireless communication device having been in the storing service mode remain undelivered while the wireless communication device is in the basic service mode, and a full service mode in which both new messages and stored messages are received by the wireless communication device while the wireless communication device is in the full service mode;

a registration process:

determining what action to take based upon the current service mode;

transmitting one or more registration messages to the messaging system during the basic service mode; and transmitting no registration messages to the messaging system during the full service mode and the storing service mode.

6. A method of registering a wireless communication device with a messaging system, the method comprising:

providing a current service mode in one of a plurality of states including:

a storing service mode in which new messages destined for the wireless communication device are not received by the wireless communication device, a basic service mode in which new messages destined for the wireless communication device are received by the wireless communication device and stored messages that remain undelivered as a result of the wireless communication device having been in the storing service mode remain undelivered while the wireless communication device is in the basic service mode, and a full service mode in which both new messages and stored messages are received by the wireless communication device while the wireless communication device is in the full service mode;

a registration process determining what action to take based upon the current service mode;

determining a status of a signal associated with a forward channel from a messaging system to the wireless communication device;

determining a quality metric based upon the status over a predetermined period of time;

if the current service mode is the storing service mode, transitioning to the basic service mode after determining the quality metric is better than a first predetermined threshold;

if the current service mode is the basic service mode transitioning to the full service mode after verification of a reverse channel from the wireless communication device to the messaging system;

if the current service mode is the full service mode, transitioning to the basic service mode after determining the reverse channel has become degraded; and determining an initial value for the current service mode by inspecting the signal for synchronization information, initializing the current service mode to the storing service mode if no synchronization information is found, and initializing the current service mode to the basic service mode if synchronization information is found.

7. A method of registering a wireless communication device with a messaging system, the method comprising:

providing a current service mode in one of a plurality of states including:

a storing service mode in which new messages destined for the wireless communication device are not received by the wireless communication device, a basic service mode in which new messages destined for the wireless communication device are received by the wireless communication device and stored messages that remain undelivered as a result of the wireless communication device having been in the storing service mode remain undelivered while the wireless communication device is in the basic service mode, and a full service mode in which both new messages and stored messages are received by the wireless communication device while the wireless communication device is in the full service mode;

a registration process determining what action to take based upon the current service mode;

determining a status of a signal associated with a forward channel from a messaging system to the wireless communication device;

determining a quality metric based upon the status over a predetermined period of time;

if the current service mode is the storing service mode, transitioning to the basic service mode after determining the quality metric is better than a first predetermined threshold;

if the current service mode is the basic service mode, transitioning to the full service mode after verification of a reverse channel from the wireless communication device to the messaging system;

if the current service mode is the full service mode, transitioning to the basic service mode after determining the reverse channel has become degraded; and in the basic service mode, transitioning to the storing service mode after the status indicates the wireless communication device is out of range;

in the full service mode, transitioning to the basic service mode after determining the quality metric is worse than a second predetermined threshold; and in the full service mode, transitioning to the storing service mode after the status indicates the wireless communication device is out of range.

8. A wireless communication device comprising:

a storage device having stored therein a service mode determination routine for providing a plurality of service modes including a full service mode, a basic service mode and a storing service mode;

a processor coupled to the storage device to execute the service mode determination routine to evaluate a quality metric associated with a forward channel from a messaging system and identify a current service mode from the plurality of service modes, where:

the quality metric is generated based upon a status of a signal associated with the forward channel;

the current service mode is updated to the basic service mode from the storing service mode if the quality metric is better than a first predetermined threshold;

the current service mode is updated to the full service mode from the basic service mode after verifying a reverse channel from the wireless communication device to the messaging system;

the current service mode is updated to the basic service mode from the full service mode after determining the reverse channel has become degraded;

new messages destined for the wireless communication device are not received by the wireless communication device while the wireless communication device is in the storing service mode, wherein new messages destined for the wireless communication device are received by the wireless communication device and stored messages that remain undelivered as a result of the wireless communication device having been in the storing service mode remain undelivered while the wireless communication device is in the basic service mode, and wherein both new messages and stored messages are received by the wireless communication device while the wireless communication device is in the full service mode;

the current service mode is updated to the storing service mode from the basic service mode after the status indicates the wireless communication device is out of range;

the current service mode is updated to the basic service mode from the full service mode after determining the quality metric is worse than a second predetermined threshold; and the current service mode is updated to the storing service from the full service mode after the status indicates the wireless communication device is out of range.

9. A wireless communication device comprising:

a storage device having stored therein a registration routine that determines registration processing based upon a current service mode;

a processor coupled to the storage device to execute the registration routine to transmit zero or more registration messages to a messaging system based upon the current service mode, where:

a storing service mode is provided in which new messages destined for the wireless communication device are not received by the wireless communication device;

a basic service mode is provided in which new messages destined for the wireless communication device are received by the wireless communication device and stored messages that remain undelivered as a result of the wireless communication device having been in the storing service mode remain undelivered while the wireless communication device is in the basic service mode;

a full service mode is provided in which both new messages and stored messages are received by the wireless communication device;

one or more registration messages are transmitted to the messaging system while the current service mode is the basic service mode; and no registration messages are transmitted to the messaging system while the current service mode is the full service mode or the storing service mode.

* * * * *